United States Patent [19]

Hazenbroek

[11] Patent Number: 5,173,076
[45] Date of Patent: Dec. 22, 1992

[54] THIGH DEBONER WITH TRAY CONVEYOR

[76] Inventor: Jacobus E. Hazenbroek, Burg de Zeeuwstraat 52, Numansdorp, Netherlands

[21] Appl. No.: 823,717

[22] Filed: Jan. 22, 1992

[51] Int. Cl.⁵ ............................................. A22C 25/16
[52] U.S. Cl. ................................... 452/135; 452/138
[58] Field of Search ................. 452/135, 138, 136, 71, 452/94

[56] References Cited

U.S. PATENT DOCUMENTS

| | | | |
|---|---|---|---|
| 3,456,284 | 7/1969 | Werner et al. | 17/1 |
| 3,672,000 | 6/1972 | Martin et al. | 17/11 |
| 4,327,463 | 5/1982 | Martin | 17/11 |
| 4,377,884 | 3/1983 | Viscolosi | 452/138 |
| 4,488,332 | 12/1984 | Atteck et al. | 17/46 |
| 4,495,675 | 1/1985 | Hill et al. | 17/04 |
| 4,736,492 | 8/1988 | Hazenbroek | 17/46 |
| 4,811,456 | 3/1989 | Heuvel | 17/1 G |
| 4,843,362 | 7/1989 | Bowen | 17/11 |

Primary Examiner—Bruce M. Kisliuk
Assistant Examiner—Lawrence Cruz
Attorney, Agent, or Firm—Hopkins & Thomas

[57] ABSTRACT

Parts of animals and edible fowl, such as poultry thighs (26) are deboned by loading the parts onto a series of carrier trays (55), with the thigh bones (27) extending transversely to the direction of movement of the carrier trays (55) along a processing path (43). Compound pusher assemblies (52) each engage one end of the thigh bones (27) and urge the thigh bones (27) longitudinally through apertures (64) formed in stripper discs (63) positioned adjacent the rear edges (57) of the carrier trays (55). As the thigh bones (27) pass through the apertures (64), the thigh bones (27) are engaged by stripper edges (66), which scrape the thigh meat (31) from the thigh bones (27) as the thigh bones (27) are progressively urged through the apertures (64) of the stripper discs (63).

18 Claims, 4 Drawing Sheets

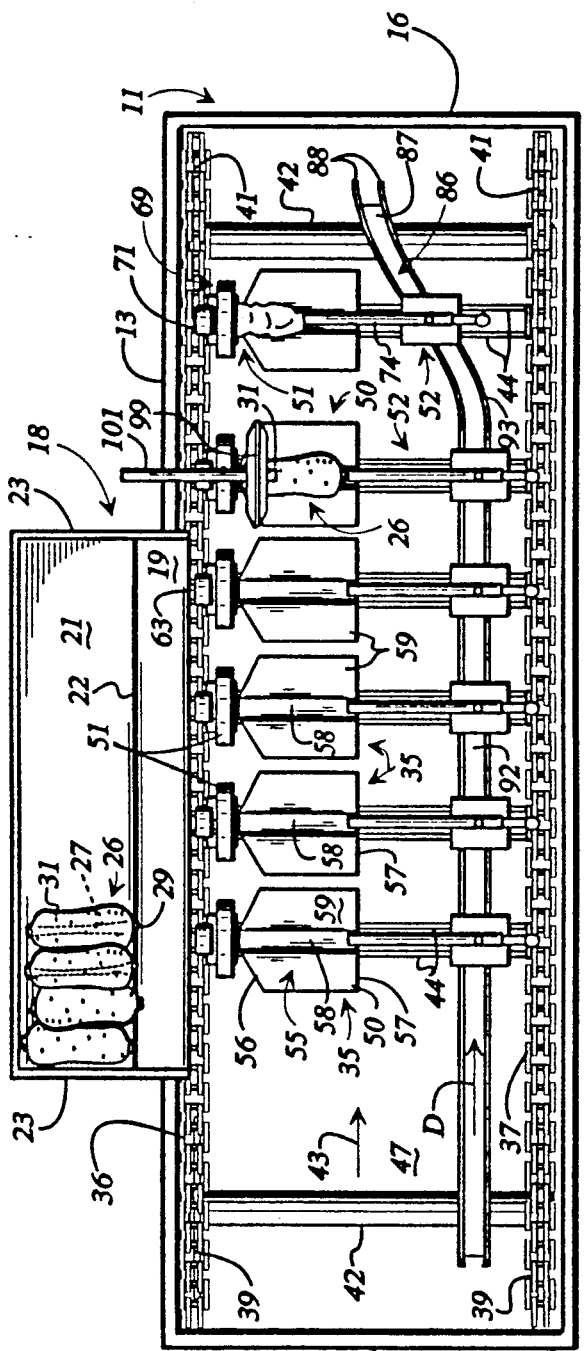
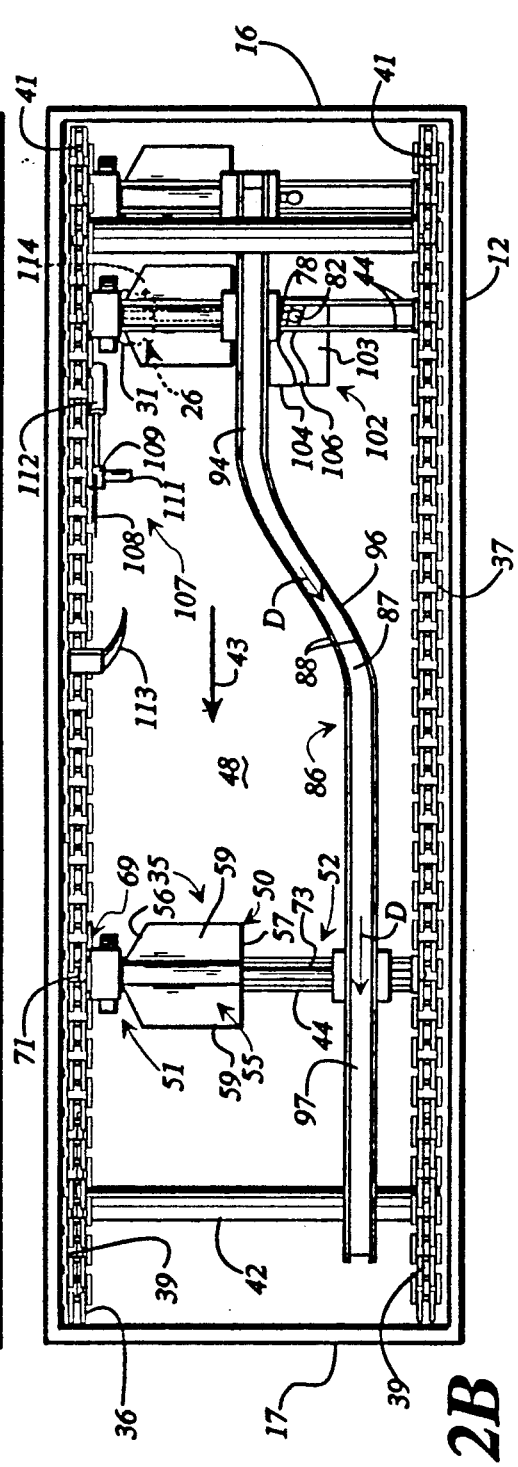
FIG 2A
FIG 2B

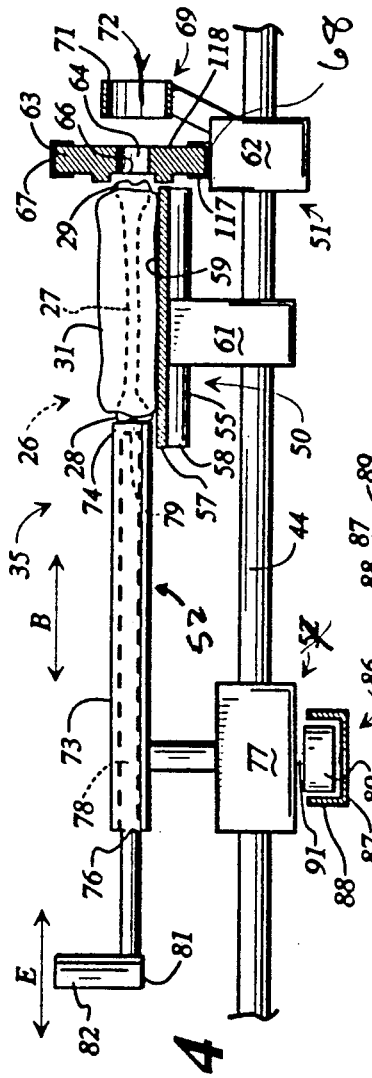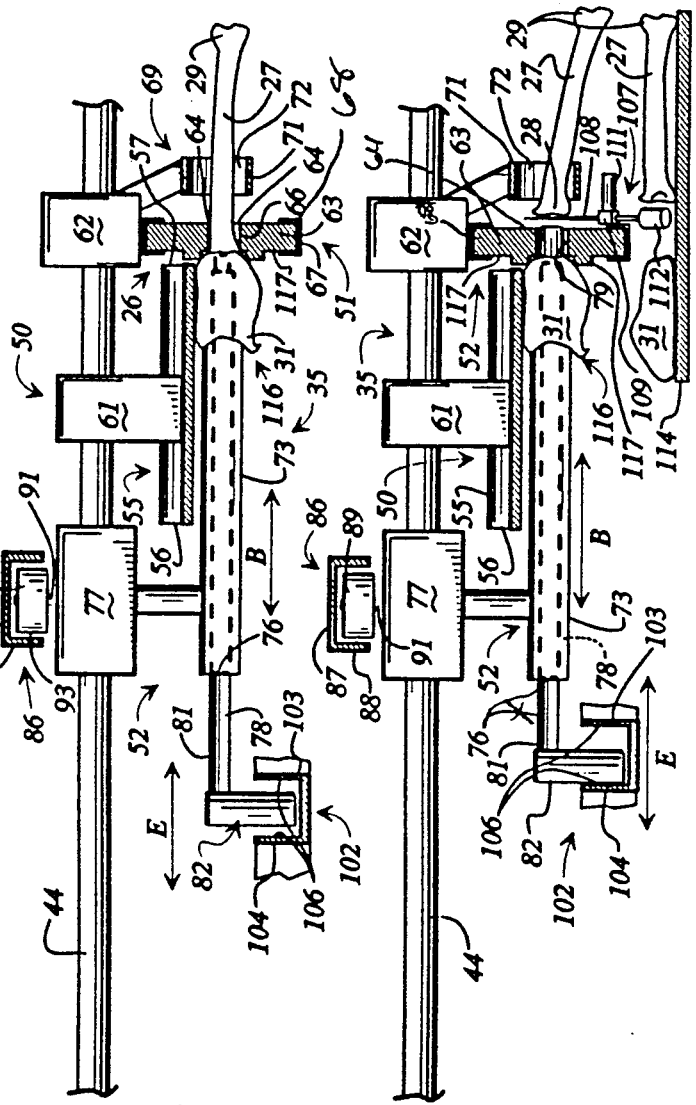

THIGH DEBONER WITH TRAY CONVEYOR

FIELD OF THE INVENTION

This invention relates in general to a method and apparatus for removing the bones from poultry and animal parts. More particularly, the present invention relates to a method and apparatus for deboning poultry thighs by urging the bone longitudinally with respect to the meat and stripping the meat from the bone.

BACKGROUND OF THE INVENTION

In the processing and preparation of parts of poultry and animals such as poultry thighs for sale and consumption in the retail market, such as in restaurants and grocery stores, it is highly desirable to package and serve the meat with the bones removed. Deboned meat can be easily cut-up and used in sandwiches or other food products where it is desirable to have the bone previously removed prior to cooking and serving.

An additional advantage of removing the bones from the meat during processing is that the bones do not have to be cooked with the meat, thereby conserving heat energy. Further, the removal of the bone prior to cooking allows the bone to be saved and used for bone meal or related products.

In the past, automated processes have been developed for the removal of meat from the bone of a poultry part, such as from the thigh bone of a poultry thigh, by engaging the bone with a scraping tool and scraping along the length of the bone. For example, U.S. Pat. Nos. 3,672,000, 4,327,463 and 4,495,675 disclose deboning apparatus having two or more notched scraping blades which engage the bone. The blades are closed about the bone with the notches of the blades straddling the bone, and the bone is moved longitudinally through the blades. As the bone is moved through the notched blades, the blades progressively scrape the meat from the bone.

However, the raw meat has a tendency to cling tightly to the bone. Consequently, it is necessary for the scraper blades to engage the thigh bones in tight frictional contact to ensure the meat is completely scraped from the bone. A problem that arises with such prior art deboners is that the blades engaging the bone sometimes inadvertently gouge or chip and sometimes crack the bones as they scrape the bones. This creates bone fragments that can become lodged in the stripped meat, which creates a serious health risk to the ultimate consumer who expects that when he or she purchases a "boneless" product, it is indeed completely boneless.

Accordingly, it can be seen that it would be highly desirable to provide a method and apparatus for cleanly and completely scraping the meat from the thigh bone of poultry parts or similar animal parts without the risk of engaging the thigh bones and creating bone chips or fragments that can become lodged in the meat of the parts.

SUMMARY OF THE INVENTION

Briefly described, the present invention comprises a method and apparatus for removing the meat from the thigh bones of poultry thighs or similar animal parts. In a preferred embodiment of the invention, the thigh deboner with tray conveyor includes a plurality of deboning modules each mounted on pairs of rigid travel rods. The travel rods are attached at their ends to a pair of spaced apart chain conveyors and the chain conveyors revolve about pairs of sprockets, carrying the deboning modules in series along a substantially endless processing path. A poultry thigh is loaded into each deboning module as the deboning modules are carried along an upper run of the processing path and the meat is stripped from the bones of the poultry thighs as the deboning modules are carried along a lower run of the processing path.

Each deboning module carried by the chain conveyor includes a carrier tray assembly, a bone pusher assembly and a meat stripper disc assembly. Each carrier tray assembly has a substantially rectangular carrier tray, in which a semicylindrical recess is formed and which receives and carries the poultry parts during processing. On each side of the semicylindrical recess is a wing or side flanged portion that prevents the poultry parts from falling or being dropped into the machine. The carrier trays are mounted on a support block that is rigidly attached to the travel rods to fix the carrier trays in place with respect to the travel rods.

A meat stripper disc assembly is mounted to the travel rods at one end of each carrier tray. Each meat stripper disc assembly has a flexible stripper disc supported within a rigid circular collar to stabilize and support the stripper discs. An aperture is formed approximately through the center of each stripper disc and receives the thigh bones therethrough. As the thigh bones pass through the apertures in the stripper discs, the meat is progressively stripped from the thigh bones by the stripper disc. A guide socket is mounted behind each stripper disc, aligned with the aperture of each stripper disc, and receives and stabilizes the thigh bone as the thigh bone is urged through the aperture in the stripper disc during the stripping operation.

Each deboning module also includes a bone pusher assembly at the opposite end of the carrier tray from the stripper disc. Each bone pusher assembly includes a hollow pusher sleeve having open front and rear ends mounted on a carrier block that is slidably attached to the travel rods to enable the pusher sleeve to be moved into and out of engagement with the poultry thighs on the carrier trays. A cam follower is affixed to the bottom of each carrier block and engages and rolls along a first cam track positioned below the deboning modules and extending along the processing path as the deboning modules are carried along their processing path. As the cam follower engages its cam track, the pusher sleeve engages and urges the poultry thighs toward the meat stripper disc assemblies, with the thigh bones being urged through the apertures of the stripper discs.

A pusher rod is slidably mounted within each pusher sleeve and extends through each pusher sleeve. Each pusher rod has a tapered front end that telescopes into and out of each pusher sleeve to engage the thigh bones, and a rear end extending outwardly from the rear end of each pusher sleeve. A cam is attached to the rear end of each pusher rod and engages a second cam track, which causes the tapered front end of each pusher rod to telescope out of the pusher sleeve to engage and urge the thigh bone completely through the aperture of the stripper disc to complete the stripping of the meat from the thigh bone.

After the meat has been stripped from the bone, the deboning modules pass adjacent a cutting means. The cutting means is a cutting blade aligned with the space between the stripper disc and the guide socket and cuts any tendons or strips of meat still clinging to the bone.

Upon completion of the removal of the meat from the bone, the meat and the bone drop away from the deboning modules for collection and later processing.

Thus, it is an object of this invention to provide an improved method and apparatus for reliably and expediently removing the meat from the bones of poultry thighs and similar animal parts.

Another object of this invention is to provide a method and apparatus for removing the meat from the bones of poultry thighs and similar animal parts with reduced risk of cracking or chipping the bones and creating bone fragments in the meat.

Another object of this invention is to provide a high speed automated apparatus for reliably removing the meat from the bones of poultry thighs and similar animal parts and which is safe and easy to load the poultry thighs into the apparatus.

Other objects, features and advantages of the present invention will become apparent upon reading the following detailed description when taken in conjunction with the accompanying drawings.

BRIEF DESCRIPTION OF THE DRAWINGS

FIG. 2a is a schematic illustration of the upper run of thigh deboner with tray conveyor and the process by which the thighs are loaded into the carrier trays.

FIG. 2b is a schematic illustration of the lower run of the thigh deboner with tray conveyor and the process by which the meat is stripped from the thigh bones.

FIG. 4 is an end cross-sectional view of a deboning module with a poultry thigh loaded thereon.

FIG. 5 is an end cross-sectional view of a deboning module showing the bone of a poultry thigh being urged through the stripper disc and guide socket.

FIG. 7 is an end view showing the bone of the poultry thigh being urged through the stripper disc and separated from the meat of the poultry thigh.

DETAILED DESCRIPTION OF THE PREFERRED EMBODIMENT

Figure 1:
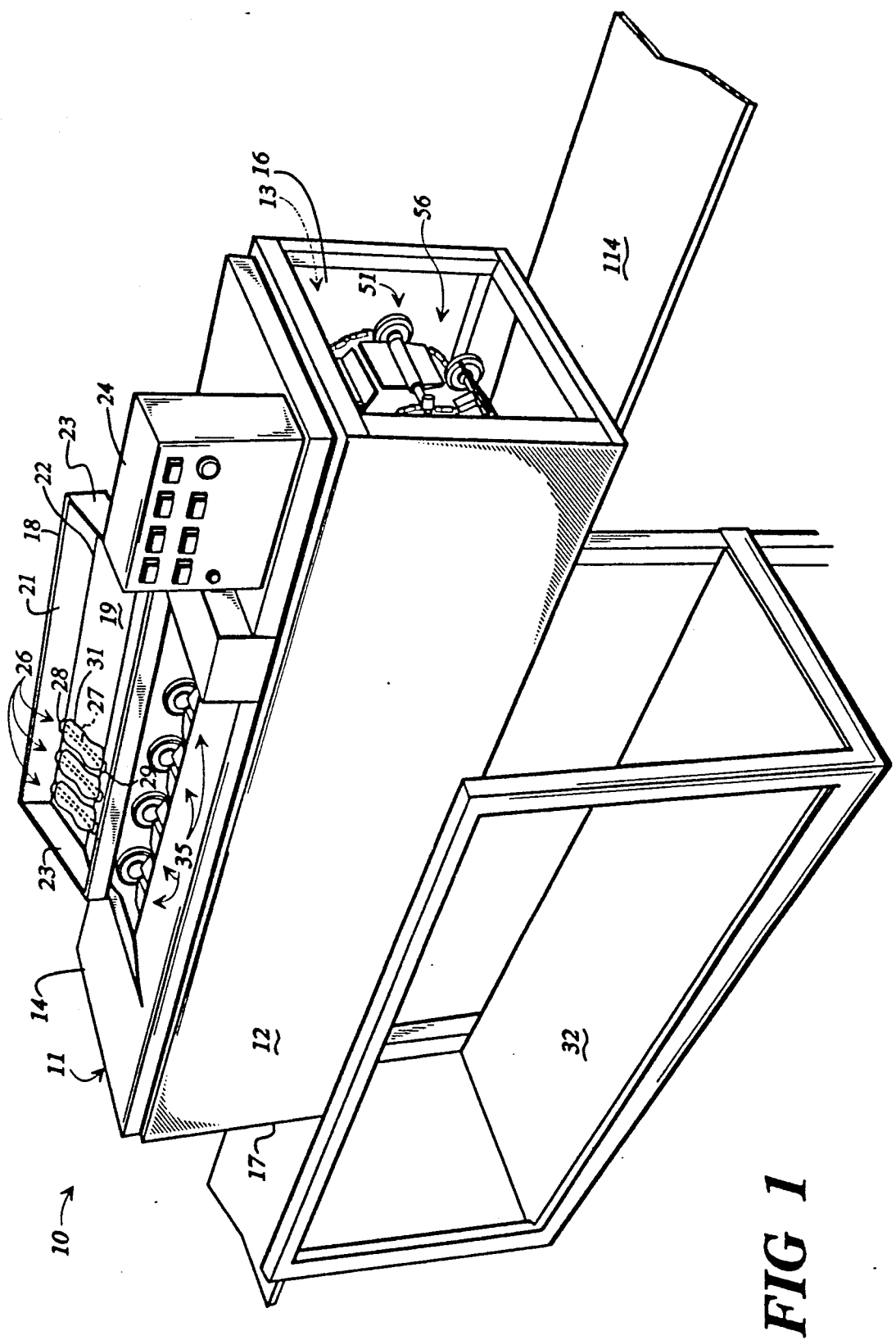
FIG. 1 is a perspective view of the thigh deboner with tray conveyor.

Referring now in greater detail to the drawings, in which like numerals indicate like parts throughout the several views, FIG. 1 illustrates the poultry thigh deboner with tray conveyor 10 in perspective. As illustrated in FIG. 1, the thigh deboner with tray conveyor 10 includes a substantially rectangular support housing 11 having a front panel 12, a rear panel 13, a top panel 14, and right and left sides 16 and 17. A substantially rectangular loading tray 18 is mounted on the top panel 14 of the support housing 11 adjacent rear panel 13. The loading tray 18 has a downwardly slanting front portion 19, a rearwardly slanting rear portion 21 extending upwardly from one edge 22 of the front portion 19, and triangularly shaped side walls 23 at its ends. The front and rear portions 19 and 21 and the side walls 23 of the loading tray 18 form a collection trough or bin 24 for holding a plurality of poultry thighs 26 or other similar animal parts to be deboned.

As illustrated in FIG. 1, each poultry thigh 26 includes a thigh bone 27, shown in dashed lines. Each thigh bone 27 has a large knuckle end 28 and a small knuckle end 29, and is surrounded by meat 31 along its length.

An operator's platform 32 is positioned adjacent the front panel 12 of the support housing 11 and is generally attached to the support frame 11 as by welding. The platform 32 provides a place for one or more operators (not shown) to stand while loading poultry thighs 26 from the loading tray 18 into a plurality of deboning modules indicated generally by 35.

Figure 3:
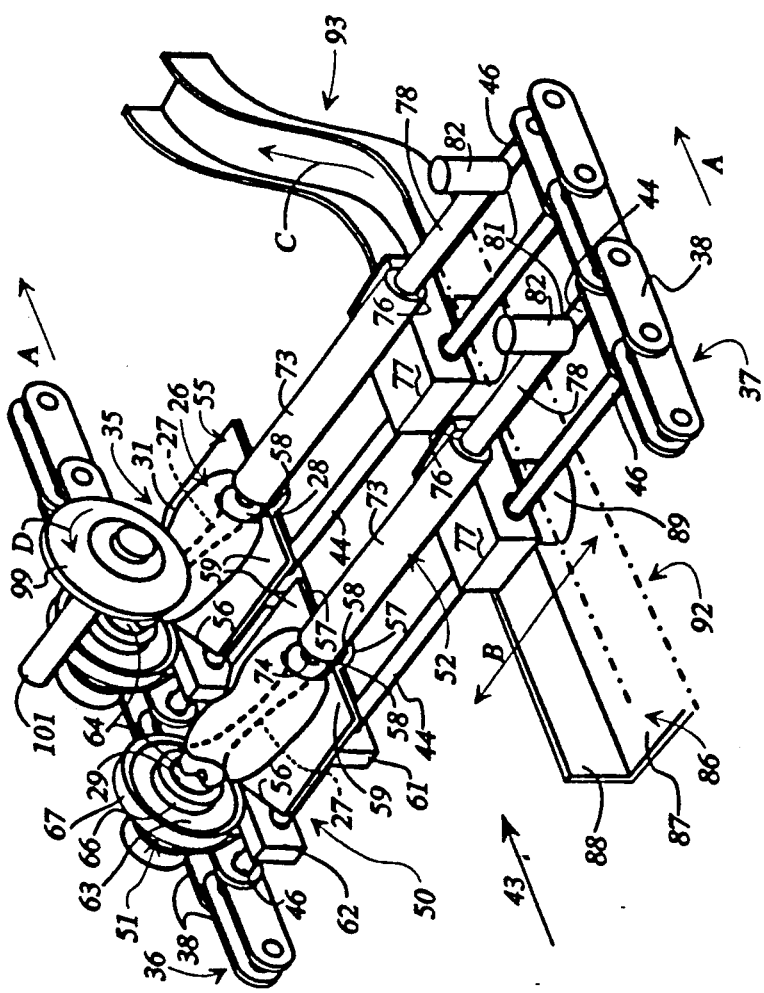
FIG. 3 is a perspective view schematically illustrating the thigh deboner with tray conveyor immediately after a poultry thigh has been loaded into a deboning module.

As shown in FIG. 2, positioned within the support frame 11, adjacent the front and rear sides 12 and 13 of the support frame, are a pair of chain conveyors 36 and 37. The chain conveyors each include a plurality of linkages 38 (FIG. 3) attached together in series to form substantially endless moving chains. As shown in FIG. 2, each of the chain conveyors 36 and 37, extend longitudinally from the left end 17 of the support frame 11 toward the right end 16 of the support frame, revolving about pairs of sprockets 39 and 41. The sprockets of each pair are connected by an axle 42, and one pair of sprockets 39 or 41 is attached in a driving relationship to a drive motor (not shown), which drives the sprockets in order to cause the revolution of the chain conveyors in the direction of arrows A (FIG. 3). As indicated in FIG. 2, as the chain conveyors 36 and 37 revolve about the pairs of sprockets 39 and 41, they carry the deboning modules 35 in series along a processing path indicated by arrows 43 for the stripping and removal of the thigh meat 31 from the thigh bones 27 of the poultry thighs 26.

As shown in FIG. 2A, the processing path 43 includes an upper run 47 extending from the left end 17 of the support frame 11 toward the right end 16 adjacent the loading tray 18, along which the poultry thighs are loaded within the deboning modules, and a lower run 48 (FIG. 2B) positioned below and parallel to the upper run 47 (FIG. 2A), extending from the right end 16 of the support frame toward the left end 17 along which the thigh meat 31 is stripped from the thigh bones. Pairs of travel rods 44 are attached at their ends 46 to links 38 of the chain conveyors 36 and 37 for each module 35. The travel rods extend between the two chain conveyors, in a direction transverse to the direction of movement of the chain conveyors along processing path 43, and each pair of travel rods supports a deboning module 35 during the movement of the deboning module along its processing path 43. Together, the chain conveyors and travel rods attached thereto function as a conveying means for transporting the deboning modules along their processing path 43.

FIGS. 3-7 illustrate the deboning modules 35 in greater detail. Each deboning module includes a carrier tray assembly 50, a meat stripper disc assembly 51, and a bone pusher assembly 52. As shown in FIGS. 2A, 3, and 4, each carrier tray assembly 50 includes a carrier tray 55 having a front edge 56 facing its disc assembly 51 and a rear edge 57 facing away from its disc assembly and toward the bone pusher assembly 52. An elongated semicylindrical recess 58 is formed approximately in the center of each carrier tray, extending between the front edge 56 and the rear edge 57 of each carrier tray 55. In the embodiment illustrated, each semicylindrical recess 58 (FIGS. 2A and 3) is approximately ¾-1 inch in width, sized and shaped to receive and support a poultry thigh therein. The semicylindrical recesses each function as a cradle or holding means for receiving and holding a poultry thigh 26 with the bone extending along the length of the recess, as shown in FIG. 3. Each carrier tray 55 also includes a pair of side flanges or wings 59 (FIG. 3) extending laterally from the sides of the semicylindrical recesses 58. The wings 59 function to prevent the poultry thighs 26 from falling or being dropped into the center of the machine as they are loaded into the semicylindrical recesses of the carrier trays by an operator. As shown in FIGS. 3 and 4, the carrier trays 55 are mounted on a support block 61 that is fixedly attached to the pair of travel rods 44 of that particular deboning module 35 in order to secure the carrier trays in a fixed position on the travel rods.

As FIGS. 3, 4, and 5 illustrate, the meat stripper disc assembly 51 of each deboning module 35 is mounted upon a support block 62 with the support block being rigidly attached to the pair of travel rods 44, with the meat stripper disc assembly being positioned adjacent the front edge 56 of the carrier tray 55. Each meat stripper disc assembly includes a flexible stripper disc 63 made from rubber or similar material positioned adjacent the front edge 56 of its carrier tray. An aperture 64 is formed approximately in the center of each stripper disc 63 and aligned with the semicylindrical recess 58 (FIG. 3) of its carrier tray. Each aperture 64 (FIG. 4) has a diameter of approximately 10 millimeters and has a circular stripper edge 66. The apertures of the stripper discs receive the thigh bones of the poultry thighs therethrough, with the stripper edges 66 of the apertures on the side that faces the carrier tray 55 of its deboning module being chamfered to aid in the passage of the thigh bones 27 through the apertures 64. The stripper edge 66 of each aperture snugly engages about the thigh bone of each poultry thigh and retards the passage of the thigh meat through the apertures with the passage of the thigh bones. As a consequence, as the thigh bones pass through the apertures, the thigh meat 31 of the poultry thighs is progressively stripped from the thigh bones.

As illustrated in FIGS. 4 and 5, each stripper disc is mounted in a circular metal frame 67 circumscribed about the outer edge 68 of each stripper disc 63 and is attached directly to the support block 62. The circular frame 67 functions to hold each stripper disc 63 in place as the thigh bones are urged through the apertures 64 during a stripping operation. The frames 67 thus ensure that the flexible discs do not collapse and are not simply pushed rearwardly by the thigh bones during a stripping operation. A guide socket 69 is attached to a support block 62, which is mounted on the travel rods 44, and is positioned behind each stripper disc 63, aligned approximately with the aperture 64 formed within each stripper disc. The guide socket 69 is a circular ring or collar 71 having a central opening 72 of a sufficient diameter to enable the knuckles 28 and 29 (FIG. 7) of each thigh bone 27 to pass through the guide socket without interference but yet restricts excess movement of the thigh bones from side to side or vertically during the stripping and separation of the thigh meat 31 from the thigh bones 27, as shown in FIGS. 5 and 7.

As shown in FIGS. 3 and 4, each bone pusher assembly 52 is initially positioned adjacent the rear edge 57 of each carrier tray 55, aligned with the semicylindrical recess 58 formed within each carrier tray. Each bone pusher assembly includes a hollow cylindrical pusher sleeve 73, having open front end 74 and an open rear end 76, mounted upon a carrier block 77. The carrier blocks 77 are slidably mounted upon the travel rods 44 for each deboning module to enable the pusher sleeve 73 of each deboning module to be moved laterally in the direction of arrows B into engagement with a poultry thigh positioned on its carrier tray. As shown in FIG. 4, a cylindrical pusher rod 78 extends through each pusher sleeve 73 and out the end 76 of each pusher sleeve. Each pusher rod 78 is slidably mounted within its pusher sleeve and has a tapered front end 79 (FIG. 4), which telescopes into and out of the front end of each pusher sleeve 73 to engage and urge the thigh bones through the apertures of the stripper discs (FIGS. 5 and 7), and a rear end 81 extending out the open rear end 76 of each pusher sleeve 73 and has a cylindrical cam 82 attached to and extending upwardly therefrom.

As shown in FIGS. 2A and 2B, a first cam track 86 is positioned beneath the bone pusher assemblies 52 of the deboning modules 35. The cam track 86 extends along the length of the processing path 43 substantially parallel to the chain conveyors 36 and 37. The cam track 86 includes a bottom plate 87 and a pair of vertically oriented side walls 88. As shown in FIGS. 4 and 5, a cam follower 89 is attached to the bottom of the carrier block 77 of each bone pusher assembly 52 by an axle 91 and is positioned between the side walls 88 of the cam track 86. As the chain conveyors carry the deboning modules along the processing path, the cam follower engages and rolls along the side walls of the cam track in the direction of arrows C (FIG. 3). As the cam follower 89 rolls along the side walls 88 of the cam track 86, the carrier blocks of the bone pusher assemblies are moved laterally in the direction of arrows B (FIG. 4) toward the carrier trays 55, causing the pusher sleeves 76 of the bone pusher assemblies to engage and urge the poultry thighs 26 toward the meat stripper disc assemblies 51.

As shown in FIG. 2A, the cam track 86 follows a substantially straight path parallel to and adjacent chain conveyor 37 at the point where the deboning modules pass the loading tray 18, as indicated by 92, for loading the deboning modules with poultry thighs 26. After passing the loading tray, the cam track begins to curve and extends diagonally toward chain conveyor 36, as indicated by 93, to cause the bone pusher assemblies 52 to travel into engagement with the poultry thighs on the carrier trays to start the stripping operation. The cam track then extends along a substantially straight path, shown at 94 (FIG. 2B), as the thigh bones 27 are pushed through the apertures 64 of the stripper discs 63 and are separated from the thigh meat 31 to complete the stripping operation. At the point where the thigh bones are separated from the thigh meat, the cam track then begins to curve and extend diagonally toward the chain conveyor 37, as indicated at 96, and then straightens out, as indicated at 97, to cause the bone pusher assemblies to return to their retracted loading position to enable poultry thighs 26 to be loaded into the deboning modules 35.

As shown in FIG. 3, a circular adjustment disc 99 rotatably attached to an axle 101 is positioned adjacent the angled section 93 of the cam track 86. After the poultry thighs 26 are loaded onto the carrier trays, the carrier trays pass beneath the adjustment disc 99 which engages and presses the poultry thighs against the carrier trays as it rotates in the direction of arrows D. The engagement of the poultry thighs 26 by the adjustment disc 99 tends to urge the poultry thighs into the semicylindrical recesses 58 of the carrier trays 55. This ensures that the poultry thighs are properly seated within the semicylindrical recesses 58 of the carrier trays 55 prior to the engagement of the poultry thighs by the pusher sleeves 76 of the bone pusher assemblies 52 at the start of the stripping operation.

Figure 6:
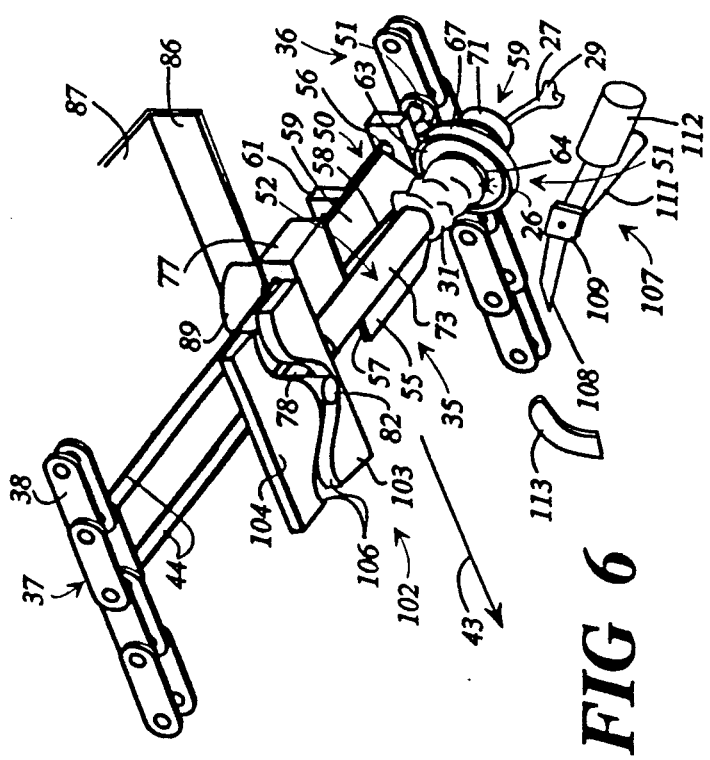
FIG. 6 is a perspective view schematically illustrating the engagement of the cam attached to the pusher rod with the second cam track.

As shown in FIGS. 2B and 6, a second cam track 102 is positioned along section 94 of cam track 86, in a position to receive and be engaged by the cams 82 attached to the pusher rods 88 of the bone pusher assemblies 52. Cam track 102 includes a pair of cam plates 103 and 104, each having a series of cam surfaces 106 that are engaged by the cams 82 and cause the pusher rods to be urged laterally in the direction of arrows E (FIG. 5). As illustrated in FIG. 7, the movement of the pusher rods 78 in the direction of arrows E causes the tapered front ends 74 of the pusher rods to telescope out of the open front ends 74 of the pusher sleeves to engage and urge the large knuckle ends 28 of the thigh bones completely through the apertures of the stripper disc.

A cutting means 107 (FIGS. 6 and 7) is positioned downstream from the point along section 94 (FIG. 2B) of cam track 86 at which the thigh bones are urged completely through the apertures of the stripper discs aligned with the gap between the stripper discs 63 (FIGS. 6 and 7) and the guide sockets 69 of each deboning module. The cutting means includes a knife or cutting blade 108, which is mounted to a sleeve or holder 109. The knife holder is pivotally attached to a support rod 111 so that the knife 108 is able to pivot or swing about the support rod 111. As indicated in FIGS. 6 and 7, a counter weight 112 is attached to the sleeve 109 for the knife 108. The counter weight 112 maintains the knife in a substantially vertical cutting alignment to engage and sever any tendons, ligaments, or any strips of meat that might still be clinging to the thigh bones after the meat has been stripped from the thigh bones. However, if the knife contacts a thigh bone or the tapered front end 79 (FIG. 4) of the pusher rods, for example, or something else that is hard enough to engage the knife with sufficient force to overcome the counter weight, the knife can pivot about support rod 111 (FIG. 6) and allow that particular deboning module to pass without risking damage to the knife and without possibly gouging and splintering the thigh bones or interfering with the further movement of the deboning modules.

As shown in FIGS. 2B and 6, positioned downstream from the knife and aligned approximately with the curve 96 of the cam track 86, is a finger or scraper blade 113. The scraper blade 113 is aligned approximately with the front edges 56 of the carrier trays 55, and engages the thigh meat 31 on the carrier trays adjacent the stripper discs as the deboning modules continue along their processing path 43. The scraper blade 113 scrapes the meat off of the carrier trays to ensure that the meat does not cling to the carrier trays after the removal of the bone, thus clearing the carrier trays of the deboning modules for receiving additional poultry thighs as the deboning modules continue around their processing path 43 toward the loading tray 18 (FIG. 2A).

As shown in FIG. 1, a removal conveyor 114 is positioned beneath the support housing 11 extending parallel with the lower run 46 (FIG. 2B) of processing path 43. As the thigh bones and thigh meat are separated, they are dropped out the bottom of the thigh deboner with tray conveyor 10 and onto the removal conveyor 114, which carries the thigh bones and thigh meat away for inspection and processing.

OPERATION

As schematically illustrated in FIG. 2A, during the operation of the thigh deboner with tray conveyor 10, a plurality of deboning modules 35 are moved progressively past the loading tray 18 along an upper run 47 of the processing path 43. As the deboning modules pass in front of the loading tray, one or more operators standing adjacent the front side 12 of the thigh deboner with tray conveyor take poultry thighs 26 from the loading tray and place them in the deboning modules 35. Up to 110 poultry thighs per minute can be loaded in the deboning modules and deboned by the thigh deboner with tray conveyor.

As shown in FIG. 4, the poultry thighs 26 are placed within the semicylindrical recesses 58 of the carrier trays 55, resting on top of the carrier trays. The poultry thighs are positioned with the large knuckle end 28 of each poultry thigh bone 27 aligned with the open front end 74 of each pusher sleeve 73 of each bone pusher assembly 52, and the small knuckle end 29 of each thigh bone abutting the stripper discs. The small knuckle end of each thigh bone is generally aligned with the apertures of the stripper discs. As a result, the oyster, which is a small knot of meat clinging tightly to the large knuckle end of each thigh bone is removed with the rest of the thigh meat. If the position of the thighs were reversed, with the oyster abutting the stripper discs, the tight clinging contact of the oyster to the thigh bone tends to cause the oyster to stay with the bone and not be stripped away by the stripper discs. Thus, the oyster meat would either have to be manually stripped from the thigh bones in later operations or simply wasted.

As shown in FIGS. 2A and 3, after each poultry thigh has been loaded onto the carrier tray of a deboning module, the deboning modules are carried away from the loading tray and forwardly along their processing path 43 by the movement of the chain conveyors 36 and 37 in the direction of arrows A. Immediately following the loading of the carrier trays, the carrier trays are passed beneath the adjustment disc 109. As the carrier trays pass beneath the adjustment disc, the poultry thighs engage the adjustment disc, which rotates in the direction of arrow D (FIG. 3) and urges the poultry thighs toward the semicylindrical recesses 58 of the carrier trays 55. This ensures that the poultry thighs are properly seated within the semicylindrical recesses prior to the start of the stripping operation.

As the deboning modules continue along their processing path 43, the cam followers 89 (FIGS. 4, 5, and 7) mounted to the bottom of the bone pusher assemblies 52 of the deboning modules 35 engage and roll along side walls 86 of the angled section 93 (FIG. 2) of cam track 86. As the cam follower 89 (FIG. 5) of each bone pusher assembly rolls along section 93 of cam track 86, the carrier block 77 of each bone pusher assembly is urged laterally, sliding along the travel rods 44 toward the carrier trays 55. As the carrier blocks 77 begin to move laterally, they carry the pusher sleeves 73 of the bone pusher assemblies in the direction of arrows B into engagement with the thigh bones 27 of the poultry thighs 26 positioned on the carrier trays.

As shown in FIG. 4, the large knuckle 28 of each thigh bone becomes nestled within the open end 74 of each pusher sleeve while the small knuckle 29 of each thigh bone is urged into contact with the stripper edge 66 of the aperture 64 of each stripper disc 63. The thigh bone is thus held tightly at both ends to prevent the poultry thighs from falling or dropping out of the carrier trays as the carrier trays are rotated over and reoriented upside down, as shown in FIG. 2B to begin their travel along the lower run 46 of the processing path 43.

As illustrated in FIGS. 2B, 5, and 6, as the deboning modules are carried further forwardly along their processing path, the pusher sleeves 73 of the bone pusher assemblies are moved laterally as the cam followers 89 attached to their carrier blocks 77 continue to roll along the side walls 88 of cam track 86. As FIGS. 4, 5, and 7 illustrate, as the pusher sleeves are moved toward and into contact with the stripper discs, the thigh bones 27 are progressively forced into and through the apertures 64 of the stripper discs.

As the thigh bones enter and pass through the apertures of the stripper discs, the stripper edges of the apertures 64 tend to close tightly about the thigh bones, permitting only the thigh bones to pass through the apertures, while the meat 31 on each thigh bone is prevented from passing through the apertures with the thigh bones. Thus, as the thigh bones pass through the apertures, the meat 31 is progressively stripped away from the thigh bones and tends to collect in a mass 116 (FIGS. 5 and 7) against the front surfaces 117 of the stripper discs 63. The pusher sleeves are moved in the direction of arrows B until the open front end of each pusher sleeve contacts the front surfaces 117 of the stripper disc 63 of each meat stripper disc assembly 51 of each deboning module.

As shown in FIG. 5, the thigh bones pass through the apertures of the stripper discs and are received within the guide sockets 69 passing through the openings 72 of the guide sockets. The guide sockets maintain the longitudinal alignment of the thigh bones as the thigh bones through the apertures of the stripper discs in order to prevent the thigh bones from twisting or flopping from side to side and possibly becoming jammed between the stripper discs and the pusher sleeves thereby disrupting the operation of the thigh deboner with tray conveyor 10 (FIGS. 1 and 2). As the open front ends 74 (FIG. 5) of the pusher sleeves 73 come into contact with the front surfaces 117 of the stripper discs 63, the large knuckle end 28 of each thigh bone 27 remains within the apertures 64 and has not yet passed completely through the apertures of the stripper discs.

At this point, as the deboning modules are carried further forwardly along their processing path 43, the cam 82 (FIG. 6) attached to the rear end of each pusher rod 78 engages the cam surfaces 106 of the second cam track 102. As cam 82 engages the cam surfaces 106 of cam track 102, its pusher rod 78 is urged in the direction of arrows E (FIGS. 5 & 7) toward the stripper discs. The movement of the pusher rods 78 toward the stripper discs causes the tapered front end 79 (FIG. 7) of each pusher rod to telescope out the open front end of its pusher sleeve into engagement with the large knuckle end 28 of each thigh bone 27.

As shown in FIG. 7, the tapered front ends of the pusher rods urge the large knuckle ends of the thigh bones completely through the apertures of the stripper discs to complete the stripping of the meat 31 from the thigh bones. As shown in FIG. 6, immediately following the point at which the large knuckle ends of the thigh bones are urged completely through the apertures of the stripper discs, the cam 82 is urged rearwardly away from the stripper discs as it moves along a rearwardly slanting portion of the cam surfaces 106 of cam track 102. This causes the tapered front ends of the pusher rods to be retracted back through the apertures and away from the thigh bones to prevent the tapered front ends of the pusher rods from engaging the knife 108.

As the tapered front ends of the pusher rods are retracted rearwardly through the apertures of the stripper discs, the deboning modules are carried further forwardly into engagement with the knife 108 of a cutting means 107. The knife blade 108 of the cutting means is positioned within the gap between the rear surface of the stripper discs and the guide sockets. As the deboning modules move past the knife, the knife engages and cuts through any tendons, ligaments, or strips of meat that remain clinging to the thigh bone, to thereby complete the separation of the meat from the thigh bone. During the cutting operation, any side-to-side movement by the thigh bones is restricted by the collars of the guide-sockets which prevent the thigh bones from moving from side to side or bending around and possibly engaging the knife blade. This ensures a clean and accurate separation of the tendons, etc., connecting the thigh bones to the thigh meat to thereby separate the thigh bones from the thigh meat.

As shown in FIGS. 2B and 6, after the deboning modules have passed by the cutting means, and the thigh meat has been completely stripped and separated from the thigh bones, the deboning modules move toward a scraper blade 113, positioned adjacent the front surfaces 118 of the stripper discs 63. As indicated in FIG. 7, as the deboning modules pass by the scraper blade, the scraper blade engages and urges the mass of meat 116 which has collected against the front surfaces 117 of the stripper discs away from the stripper discs. As shown in FIG. 7, the scraper blade engages and urges the mass of meat 116 clinging to the carrier trays and the stripper discs away from the carrier trays, causing it to fall onto a removal conveyor 114, which carries the meat away to later processing stations. At the same time the meat is being urged away from the carrier trays and as being dropped onto the removal conveyor 114, the thigh bones are also dropped to the removal conveyor spaced apart from the meat for removal to separate processing stations.

Simultaneously, with the scraping and removal of the meat from the carrier trays, the cam follower 89 attached to the bottom of the compound pusher assemblies, begins to roll along curved section 96 (FIG. 2B) of cam track 86, causing the carrier blocks and thus the pusher sleeves attached thereto of the compound pusher assemblies to be retracted away from the meat stripper disc assemblies. The compound pusher assemblies are retracted to their loading position with the open front ends of the pusher sleeves positioned adjacent the front edges 56 of the carrier trays 55. At this point, the deboning modules are cleared and ready for loading with additional poultry thighs and are further carried along by the chain conveyors 36 and 37 back around to the upper run 47 (FIG. 2A) of their processing path 43 to receive additional poultry thighs 26 for the continued operation of the thigh deboner with tray conveyor 10.

As the thigh bones are processed through the thigh deboner with tray conveyor, the thigh bones of the poultry thighs are substantially cleaned of thigh meat clinging thereto and the meat itself is opened up for inspection, making it easy to spot foreign materials such as bone fragments or chips, or to check for spoilage. Additionally, although the invention has been disclosed as a system and apparatus for deboning poultry thighs, it will be understood that the invention will be useful in deboning other foul and animal parts.

It will be understood that the foregoing relates only to a preferred embodiment of the present invention, and that numerous changes and modifications may be made thereto without departing from the spirit and scope of the invention as set forth in the following claims.

I claim:

1. A method of removing the bones from poultry thighs and similar edible bone and meat parts, comprising the steps of:

moving a plurality of poultry thighs in series along a processing path with the bones of each thigh extending transverse to the direction of the processing path;

as the poultry thighs move along the processing path urging the bone of each poultry thigh longitudinally through an aperture formed in a meat stripper disc assembly;

as each bone is urged through the aperture of a meat stripper disc assembly, retarding the movement of the meat with the meat stripper disc assembly to remove the meat from the bone;

urging the trailing end of the bone through the opening of the meat stripping disc assembly while retaining the meat at the meat stripper disc assembly; and moving the bone and meat of the poultry thighs adjacent a cutting means and cutting with the cutting means any meat remaining attached between the separated meat and bone of the poultry thigh.

2. The method of claim 1 and wherein the step of moving a plurality of poultry thighs in series along a processing path comprises positioning each poultry thigh within a recess formed in one of a plurality of carrier trays, and moving the carrier trays along the processing path.

3. The method of claim 1 and wherein the step of urging the bones toward engagement with a meat stripper disc assembly comprises engaging the end of each bone facing away from the stripper disc assembly with a bone pusher assembly and urging with the bone pusher assembly each bone along its length into engagement with the meat stripper disc assembly.

4. A method of removing the bones from poultry thighs and similar edible bone and meat parts, comprising the steps of:

moving a plurality of poultry thighs in series along a processing path with the bones of each thigh extending transverse to the direction of the processing path;

as the poultry thighs move along the processing path, urging the bone of each poultry thigh longitudinally through an aperture formed in a meat stripper disc assembly;

as each bone is urged through the aperture of a meat stripper disc assembly, retarding the movement of the meat with the meat stripper disc assembly to remove the meat from the bone; and extending a pusher rod longitudinally from each bone pusher assembly through the aperture of its meat stripper disc assembly to urge the trailing end of the bone through the opening of the meat stripping disc assembly while retaining the meat at the meat stripper disc assembly to thereby complete the removal of the meat from the bone of the poultry thigh.

5. Apparatus for removing the bones from poultry parts such as poultry thighs, comprising:

a support housing a conveyor means mounted within said support housing for advancing a plurality of poultry parts along a processing path;

a plurality of carrier trays mounted in series on said conveyor means for supporting the poultry parts for advancing the poultry parts along the processing path;

a meat stripper disc assembly mounted to said conveyor means adjacent one end of each of said carrier trays, each meat stripper disc assembly having an aperture formed therethrough for receiving the bone of a poultry part to strip the meat from the bone;

a bone pusher assembly mounted to said conveyor means adjacent an end of each of said carrier trays opposite said meat stripper disc assemblies and movable into engagement with the bone of a poultry part resting on its carrier tray to urge the bone of the poultry part through said aperture formed in said meat stripper disc assembly;

said bone pusher assembly, including a pusher rod extensible through said aperture of said meat stripper disc assembly for urging a trailing end of each bone through said aperture to thereby complete the stripping of the meat from the bone of the poultry part; and cam means for moving each of said bone pusher assemblies toward said meat stripper disc assemblies and into engagement with the bones of the poultry parts in response to the movement of said conveyor means along the processing path to thereby urge the bones of the poultry parts through said apertures of said meat stripper disc assemblies.

6. The apparatus of claim 5 and wherein said carrier trays each include a central recess aligned with the aperture of said meat stripper disc assembly and with said bone pusher assembly in which the poultry parts are received, and said carrier trays each including flanged portions extending laterally from both sides of said central recess.

7. The apparatus of claim 5 and wherein said conveyor means comprises a pair of chain conveyors mounted in spaced relationship adjacent opposite sides of said support framework and pairs of travel rods attached to said chain conveyors and extending between said chain conveyors and on which said meat stripper disc assemblies, carrier trays and compound pusher assemblies are mounted.

8. The apparatus of claim 5 and wherein said bone pusher assemblies each comprise a pusher sleeve slidably mounted on said conveyor means and having open front and rear ends into which said pusher rods extend, each of said pusher rods having one end which telescopes into and out of said front ends of said pusher sleeves and an opposite end extending outwardly through said rear ends of each of said pusher sleeves, to which a cam follower is attached.

9. The apparatus of claim 5 and wherein said cam means for moving said bone pusher assemblies comprises a cam track positioned adjacent said bone pusher assemblies and extending along said processing path of the poultry parts, and a cam follower attached to each of said bone pusher assemblies and engaging said cam track to cause said bone pusher assemblies to move toward and away from said meat stripper disc assemblies.

10. An apparatus for deboning animal parts having a bone surrounded by meat, such as the thighs of poultry, comprising:
- a conveying means;
- a plurality of deboning modules carried in series along a substantially endless processing path by said conveying means;
- said deboning modules each including a carrier tray assembly for supporting the poultry parts, a meat stripper disc assembly positioned at one end of said carrier tray for stripping the meat from the bones of the poultry parts, and a bone pusher assembly for urging the poultry parts into engagement with said meat stripper disc assembly;
- means for urging said bone pusher assemblies across said carrier trays and toward said meat stripper disc assemblies to urge the bones of poultry parts resting on said carrier trays through said meat stripper disc assemblies;
- said meat stripper disc assemblies each including a flexible stripper disc having an aperture formed therethrough, through which the bones of the poultry parts pass as the meat is stripped from the bones; and
- a cutting means mounted along said processing path in a position to engage the poultry parts adjacent said stripper discs to complete the separation of the meat from the bones of the poultry parts.

11. The apparatus of claim 10 and wherein said means for urging said bone pusher assemblies toward said meat stripper disc assemblies comprises a cam track positioned adjacent said bone pusher assemblies and extending along said processing path, and a cam follower rotatably attached to each of said bone pusher assemblies and which engages and moves along said cam track as said bone pusher assemblies are carried along said processing path to thereby move said bone pusher assemblies toward and away from said meat stripper disc assemblies.

12. The apparatus of claim 10 and wherein said bone pusher assemblies each include a carrier block slidably mounted on said conveying means, a cylindrical pusher sleeve mounted on said carrier blocks and having open front and rear ends, and a pusher rod slidably mounted within said pusher sleeves having front and rear ends and movable through said pusher sleeves for engaging and urging the bones through said apertures of said stripper discs.

13. The apparatus of claim 12 and further including a means for moving said pusher rods through said pusher sleeves, comprising a cam mounted to said rear end of each pusher rod and a cam track positioned along said processing path in the path of movement of said cams in a position to be engaged by said cams to thereby cause said pusher rods to be urged through said pusher sleeves, into and out of engagement with the bones of the poultry parts.

14. The apparatus of claim 10 and wherein said cutting means comprises a support bar, a cutting blade pivotally mounted on said support bar and a counter weight connected to said cutting blade to restrict the pivotal movement of said cutting blade about said support bar.

15. A method of deboning poultry thighs and similar edible meat and bone parts, comprising the steps of:
- moving the poultry thighs in spaced series along a processing path;
- as each poultry thigh is moved along the processing path, urging each poultry thigh longitudinally toward a meat stripper disc assembly;
- engaging the bones of the poultry thighs with the meat stripper disc assemblies and progressively removing the meat of the poultry thighs along the length of each bone with the meat stripper disc assemblies;
- as the meat is substantially removed from the bones of the poultry thighs, urging the bones of the poultry thighs through each meat stripper disc assembly and away from the meat of the poultry thighs;
- moving the meat and bones of the poultry thighs toward engagement with a cutting means and cutting with the cutting means any meat remaining attached between the bones of the poultry thighs and the removed meat to separate the meat from the bones of the poultry thighs.

16. The method of claim 15 and further including the step of placing each poultry thigh within a recess formed in one of a plurality of carrier trays and moving the carrier trays, with the poultry thighs loaded thereon, along the processing path.

17. The method of claim 15 and wherein the step of urging the bones toward engagement with a meat stripper disc assembly comprises engaging one end of each bone with a bone pusher assembly and urging each bone along its length into engagement with its meat stripper disc assembly.

18. The method of claim 17 and further including the steps of extending a pusher rod longitudinally from each bone pusher assembly through an aperture formed in each of the meat stripper disc assemblies, and as each pusher rod is extended through the apertures, engaging and urging the ends of the bones through the apertures with the pusher rods.

* * * * *